UNITED STATES PATENT OFFICE.

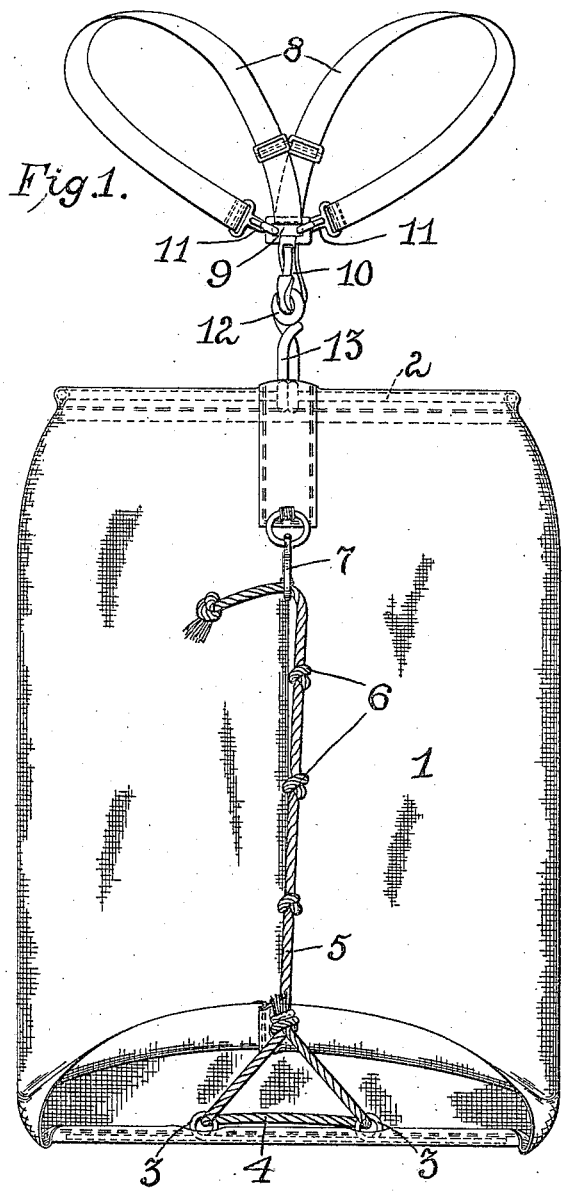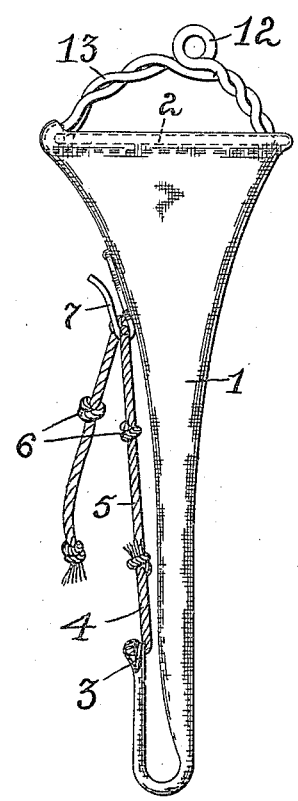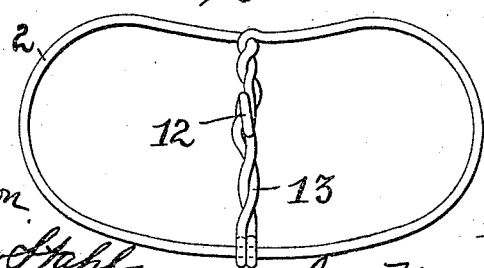

FREDERICK W. BURCH, OF PUEBLO, COLORADO.

FRUIT-PICKING BAG.

960,809.

Specification of Letters Patent. Patented June 7, 1910.

Application filed October 20, 1909. Serial No. 523,670.

*To all whom it may concern:*

Be it known that I, FREDERICK W. BURCH, citizen of the United States, residing at Pueblo, Colorado, have invented certain new and useful Improvements in Fruit-Picking Bags, of which the following is a specification.

My invention relates to fruit picking bags to be carried by the fruit picker to receive the fruit as deposited therein after being picked from the tree.

My object is to provide a bag by which the work of the fruit picker will be facilitated, it being capable of more ready and rapid adjustment than is the case with bags as now used, and will be capable of ready adjustment from its suspending means whether these suspending means are carried by the operator in the form of straps or like devices, or whether the suspending means be simply a hook on the stepladder which is used by the operator to reach the tree for picking, and my object also is to provide such a construction that will enable the bag to be readily carried when detached from its suspending means, for which purpose a handle is provided so that the bag may be carried to the point where the fruit is to be discharged from the bag into a suitable receptacle.

Further, my object is to provide a bag of simple and strong construction.

In the drawings Figure 1 is a front view of the bag constructed in accordance with my invention, with a part of one side turned back at its lower edge, to show the strengthening and adjusting means; Fig. 2 is a side view of the bag with parts in section; Fig. 3 is a plan view of the upper frame, and Fig. 4 a reduced perspective view of a preferred form of my invention.

In these drawings, 1 indicates the bag proper, which is composed of canvas, or like material, having an open upper end or mouth which is formed by attaching the upper edge of the canvas to a frame 2 made of wire or like material, and shaped to approximately elliptical or elongated form. The canvas may be attached by folding the edge of the canvas over the wire and then stitching this edge to the main portion. The bag is open at its lower end, and is provided with a reinforcing strip of wire, which is likewise stitched in place, and this reinforcing piece is provided at points intermediate of its length with eyes or loops 3 formed by making a turn in the wire. The wire projects beyond these loops to near the side edges of the bag. Through the eyes or loops thus formed, a rope or flexible connection 4 is passed, the ends of this portion being brought together and united with or continued in a single portion 5, which is provided at various points along its length with knots 6 representative of any suitable form of enlargement or projection on the rope. This rope is adapted to engage a hook 7 suitably attached to the front side of the bag by stitching or any other suitable manner, the hook being composed of wire and having its hooked end directed upwardly. By passing the cord over this hook, the bag will be doubled up intermediate of its height by making the lower portion fold upon the upper portion, where it will be sustained by the knot or enlargement on the rope engaging the side of the hook, it being understood that the space within the hook is smaller than the knot or enlargement, so that the said knot will set itself against the side of the hook, and thus suspend the folded portions of the bag.

The bag may be suspended from the shoulders of the picker or operator by means of shoulder straps 8, and these straps may be formed of one piece, the intermediate portion of which passes through an eye 9 in a snap hook 10, while the ends of the strap connect with the eye or loop 9 by means of hooks 11 attached to the ends of the shoulder strap. The snap hook 10 is adapted to engage an eye 12 of a handle member 13 preferably formed of wire, and extending in arch form over the upper open mouth of the bag about centrally thereof, the ends of this handle connecting with the wire reinforcing frame at the mouth of the bag. I prefer to form the handle of a single piece of wire, and of a continuation of the same wire which forms the upper reinforcing frame. The ends of this wire are brought together at one side of the mouth, and are twisted about each other and are then carried across the mouth of the bag in arched form, with their hooked ends engaging the wire reinforcing frame at the opposite side of the mouth.

It will be understood, of course, that the shortening of the bag at the beginning of the picking is to provide a minimum depth of bag to prevent the injury to the fruit which would otherwise occur if the fruit were allowed to drop the full length of the bag, and strike upon the bottom thereof or upon other fruit therein.

I claim as my invention:

In combination in a fruit picker bag with the bag proper, a frame at the mouth of the bag having its ends twisted together and continued across the said mouth in arched form, with an eye in one of the strands, said end being connected to the opposite side of the frame, and a hook hung from an extension of one of the ends of the frame, substantially as described.

In testimony whereof, I affix my signature in presence of two witnesses.

FREDERICK W. BURCH.

Witnesses:
J. H. McCorkle,
C. J. Deverell.